United States Patent [19]

Schreyer

[11] 3,922,304
[45] Nov. 25, 1975

[54] PROCESS FOR PREPARING P-PHENYLENEDIAMINE

[75] Inventor: Ralph C. Schreyer, Wilmington, Del.

[73] Assignee: E. I. Du Pont de Nemours & Company, Wilmington, Del.

[22] Filed: Feb. 26, 1974

[21] Appl. No.: 445,948

[52] U.S. Cl. .............................................. 260/578
[51] Int. Cl.² ..................... C07C 87/50; C07C 87/58
[58] Field of Search ................................... 260/578

[56] References Cited
UNITED STATES PATENTS

| | | | |
|---|---|---|---|
| 1,777,777 | 10/1930 | Wietzel | 260/562 |
| 2,382,433 | 8/1945 | McNally et al. | 260/207 |
| 2,525,508 | 10/1950 | Zimmerman | 260/578 X |
| 2,933,503 | 4/1960 | Clark et al. | 260/578 X |
| 3,194,839 | 7/1965 | Robinson et al. | 260/578 X |

OTHER PUBLICATIONS

Urbanski, "Chemistry and Technology of Explosives," I, MacMillan Co., N.Y., (1964), pp. 66-67.

Holleck et al., "Z. Elektrochemie," 58, 1954, pp. 867-871.

Noller, "Chemistry of Organic Compounds," third ed., W. B. Saunders Co., Phil., (1966), pp. 526-527.

Primary Examiner—Paul F. Shaver

[57] ABSTRACT p-Phenylenediamine is prepared by carbonylating aniline with carbon monoxide at a pressure of at least about 300, and preferably at least about 500, atmospheres, in the presence of an alkali metal alkoxide; nitrating the resulting formanilide, whereby p-nitroformanilide forms almost exclusively; and converting the nitro and N-formyl groups of the p-nitroformanilide to amino groups by a catalytic hydrogenation reaction and an hydrolysis, or alcoholysis, reaction. The hydrogenation and hydrolysis, or alcoholysis, can be carried out in two separate steps or simultaneously.

10 Claims, No Drawings

PROCESS FOR PREPARING P-PHENYLENEDIAMINE

BACKGROUND OF THE INVENTION

1. Field of the Invention

The present invention relates to a process for preparing p-phenylenediamine by a route based on aniline, carbon monoxide, nitric acid, and hydrogen as the primary reaction components.

2. Description of the Prior Art p-Phenylenediamine, a building block of linear aromatic polymers such as polyamides, is commonly produced by a route involving the nitration of chlorobenzene, ammonolysis of the resulting p-chloronitrobenzene, and reduction of the resulting p-nitroaniline. In view of the fact that the nitration step generally results in a mixture of o- and p-chloronitrobenzenes in a para-/ortho ratio of about 2/1, the process is inefficient with respect to chlorobenzene consumption.

An alternative route to p-phenylenediamine involves the diazotization of aniline, coupling of the resulting diazonium salt with aniline to form 1,3-diphenyltriazine, rearrangement of the latter to p-aminoazobenzene, and reduction. This process, while more specific for para intermediates, nevertheless is relatively costly in the use of diazotizing agents, and also introduces the possibility of the formation of by-products of a type which is undesirable for polymer use and which may be difficult to remove.

SUMMARY OF THE INVENTION

The present invention provides a process for preparing p-phenylenediamine which is highly selective for the formation of para intermediates, and which gives polymer-grade product while requiring no difficult purification procedures, the process comprising (a) reacting aniline with carbon monoxide at a pressure of at least about 300 atmospheres in the presence of an alkali metal alkoxide, e.g., sodium methoxide; (b) reacting the resulting formanilide with a nitrating acid; and (c) converting the nitro group and the N-formyl ($-NHCHO$) group of the resulting p-nitroformanilide to amino groups by a catalytic hydrogenation reaction and an hydrolysis, or alcoholysis, reaction.

The reactions of Step (c) can be carried out in two successive steps, i.e., hydrolysis, or alcoholysis, followed by hydrogenation, or vice versa; or in one step, i.e., by combining together all materials needed for both reactions. A high ratio of p- to o-nitroformanilides is achieved in the nitration step, leading to a high p- to o-phenylenediamine ratio in the final product.

DETAILED DESCRIPTION

The primary reaction components of the present process are aniline, carbon monoxide, nitric acid, and hydrogen. In the first step of the process, aniline undergoes carbonylation to formanilide by reaction with carbon monoxide in the presence of an alkali metal alkoxide, which acts as a catalyst for the carbonylation. The carbon monoxide pressure controls the rate of the reaction, and therefore the pressure employed will be that which will give a desired rate with a given set of reaction conditions. Pressures as low as about 300 atmospheres can be employed, although higher pressures, i.e., on the order of 500 to 700 atmospheres, are preferred for the reason that aniline undergoes faster conversion therewith. Below about 300 atmospheres the conversion of aniline is low even at long reaction times, e.g., about 2 hours. The maximum pressure which can be used is determined chiefly by considerations of technical practicality. However, there appears to be no great advantage, in terms of results achieved, in exceeding about 1000 atmospheres.

Elevated temperatures are required for the carbonylation to proceed at a reasonable rate, temperatures of at least about 100° C. being suitable. A preferred temperature range is about from 130°C. to 250°C. Temperatures in excess of about 300°C. are best avoided to reduce the likelihood of product degradation.

The carbonylation is catalyzed by the presence of an alkoxide of an alkali metal, e.g., a 1–4 carbon alkyl group alkoxide of sodium, potassium, or lithium, preferably sodium or potassium methoxide or ethoxide. The alkoxide can be introduced into the reaction vessel as a solid, or dissolved in an alcohol, e.g., sodium methoxide in methanol. The use of alochol may not be preferred, however, because of the possibility of yield loss due to the formation of an N-alkyl formanilide. In general, at least about 0.01 part (by weight) of catalyst per part (by weight) of aniline will be employed, a weight ratio of about 0.03 – 0.05/1 being particularly advantageous for achieving high yields. There is no upper limit on the amount of catalyst which can be used, although there appears to be no advantage to using more than about 0.1 part per part of aniline. Essentially complete conversion of aniline may be achieved under the conditions stated above.

In the next step of the present process, formanilide is treated with a nitrating acid, i.e., nitric acid in combination with a dehydrating acid, e.g., sulfuric acid, acetic acid, or acetic anhydride, nitric/sulfuric mixtures being preferred. The sulfuric acid, acetic acid, or acetic anhydride also acts as a solvent for the formanilide. Although the nitration can be carried out at room temperature, temperatures below about 5°C. are preferred to maximize the formation of the para, as contrasted to the ortho, isomer. A range of about from 0°C. to 5°C. is preferred.

The amount of nitric acid introduced in the nitration step is the stoichiometric amount required for mononitration, or a slight excess, e.g., up to about 1.05 moles per mole of formanilide. Larger excesses of nitric acid, e.g., nitric acid/formanilide mole ratios of about 1.1/1 and above, tend to cause dinitration.

The dehydrating acid in the mixed nitrating acid preferably is used in an amount such that more than about 3 parts of the acid are present per part (by weight) of formanilide to assure the complete dissolution of the formanilide at the low temperatures used. Preferably, the dehydrating acid/formanilide ratio (in parts by weight) is in the range of about 3.5/1 to 4.5/1, a ratio of about 4/1 being most preferred. The acid concentrations preferably should be such that the mixed nitrating acid consists of 33–38% nitric acid, 45–60% dehydrating acid, and 5–20% water.

The nitration reaction mixture preferably is agitated vigorously because, at the low reaction temperatures employed, the mixture can become quite viscous, and in such a case agitation is useful in maintaining uniformity of reaction.

The nitrated product is recovered by dilution of the mixed acid with an acid-water mixture at a temperature of about from 0°C. to 5°C., whereupon the solids separate out. In washing the solids with water, the wash water temperature preferably is kept low, e.g., at about 5°C., to prevent hydrolysis of the p-nitroformanilide therein to p-nitroaniline and subsequent reaction of the latter with the dilute acid to form the p-nitroaniline salt, e.g., sulfate.

In the present process, p-nitroformanilide is converted to p-phenylenediamine by reduction of the nitro group by catalytic hydrogenation, and hydrolysis or alcoholysis of the N-formyl group. The conversion to amino groups can be effected in two separate steps, or in a single step. For example, the p-nitroformanilide can be subjected (1) to hydrolysis or alcoholysis to form p-nitroaniline, followed by hydrogenation of the latter; or (2) to hydrogenation to form p-aminoformanilide, followed by hydrolysis or alcoholysis of the latter. Alternatively and, on an economic basis preferably, the hydrogenation and hydrolysis, or alcoholysis, reactions are performed simultaneously.

p-Nitroformanilide can be hydrolyzed by reaction with water at elevated temperature, e.g., reflux temperature (100°C.), in the presence of a catalyst, preferably a water-soluble base, e.g., an alkali metal hydroxide. p-Nitroaniline and formic acid are produced. Alternatively, the p-nitroformanilide can be subjected to alcoholysis by reaction with an alcohol such as methanol, ethanol, isopropyl alcohol, or butanol at elevated temperature, e.g., reflux temperature (boiling point of the alcohol used), in the presence of a catalyst, preferably basic, e.g., an alkali metal alkoxide such as sodium methoxide. pNitroaniline and an alkylformate are obtained. Specific reaction conditions, e.g., temperature and pressure, amount of catalyst, and amount of water or alcohol, which can be used for the hydrolysis or alcoholysis generally fall within the guidelines of those which have been described for this class of reactions, and will have an effect on the rate of hydrolysis or alcoholysis.

In the present process, p-nitroaniline produced by the hydrolysis or alcoholysis of p-nitroformanilide is hydrogenated catalytically to produce p-phenylenediamine. The usual hydrogenation catalysts, e.g., nickel and noble metals such as palladium, platinium, rutheniuim, and ruthenium can be used, palladium-on-carbon being preferred. The temperature should be at least about 50°C., and preferably at least about 75°C., and the hydrogen pressure at least about 100 psi to achieve a reasonable reaction rate, but the temperature should not be much above about 150°C., preferably not above about 125°C., to minimize the likelihood of ring hydrogenation. Pressures up to about 1000 psi can be used. Solvents for the p-nitroaniline which can be employed include water and alcohols, such as methanol, ethanol, isopropyl alcohol, and butanol.

If desired, p-nitroformanilide can be hydrogenated first under the conditions described above for the hydrogenation of p-nitroaniline. In the absence of a basic catalyst, no significant hydrolysis or alcoholysis occurs and N-formyl-p-phenylendiamine (p-aminoformanilide) is obtained, which is subsequently converted to p-phenylenediamine by hydrolysis or alcoholysis as described above for the hydrolysis or alcoholysis of p-nitroformanilide. Solvents which can be used for the hydrogenation of p-nitroformanilide to p-aminoformanilide in the absence of basic catalyts include water, alcohols, and ethers, e.g., tetrahydrofuran.

In a preferred embodiment of the present process, p-phenylenediamine is obtained in one step from p-nitroformanilide by reaction of the latter in aqueous or alcoholic solution with hydrogen in the presence of a hydrogenation catalyst, preferably palladium-on-carbon, and a base, e.g., an alkali metal hydroxide or alkoxide, which catalyzes the hydrolysis or alcoholysis of the N-formyl group. The conditions described above for the hydrogenation of p-nitroaniline are employed together with the presence of water or alcohol and a base. p-Phenylenediamine is the major product obtained by the single-step hydrogenation/hydrolysis or hydrogenation/alcoholysis, which is surprising in view of the fact that the high pressure employed to achieve hydrogenation precludes the removal of the hydrolysis or alcoholysis by-product (formic acid or alkyl formate) and the reverse reaction (amine plus formic acid or alkyl formate to the N-formyl compound) might be expected to predominate under such conditions.

Any N-formyl-p-phenylenediamine found in the reaction product of the single-step hydrogenation/hydrolysis (alcoholysis) can be readily transformed to p-phenylenediamine when the pressure is reduced to atmospheric and the formic acid or alkyl formate is removed by distillation.

The following example serves to further illustrate specific embodiments of the process of the present invention. However, the example will be understood to be illustrative only and not as limiting the invention in any manner.

EXAMPLE a. Carbonylation

Fifty-one grams of aniline, 10 milliliters of methanol, and 2 grams of sodium methoxide are placed in a 300-milliliter stainless steel shaker tube and shaken at 150°C. under 700 atmospheres of carbon monoxide pressure for 30 minutes. The vessel is cooled to 25°C. and vented, and the product discharged. The product is filtered to remove traces of solid (less than 1 gram) and distilled under reduced pressure through an 18-inch Vigreux column. Distillation at 10 mm. gives about 0.5 gram of an aniline fraction boiling at 65–70°C. and about 2 grams of an intermediate fraction boiling at 70–96°C. A 54-gram fraction boiling at 95–115°C. is obtained at 1–2 mm. This high-boiling fraction contains 95% formanilide, as measured by gas chromatography. Aniline and N-methylformanilide peaks also are identified. The amount of aniline converted is 94%, at a formanilide yield of 81%.

b. Nitration

1. Colorless formanilide (38.4 grams), a solid melting at 46°C., obtained in 99+% purity by redistillation of the high-boiling fraction obtained in Step (a), is added gradually to stirred 96% sulfuric acid (160 grams) at 5–15°C. in a 300-milliliter glass vessel equipped with a reflux condenser. The addition time is about 1 hour. The mixture is cooled to 0°C. and maintained there during the dropwise addition of 57 grams of a nitric acid/sulfuric acid mixture (28.5 grams of 70% $HNO_3$ and 28.5 grams of 96% $H_2SO_4$; 1 mole $HNO_3$ per mole of formanilide). The reaction mixture is stirred for an additional 0.25 hour at $0 \pm 5°C$., and then poured onto 800 grams of ice, forming an 18% sulfuric acid slurry. The resulting solid is filtered through a sintered glass filter funnel and washed with 2 liters of ice water (5°C.). The product is suction-dried overnight and air-dried for 2 days. The dried solid weighs 45.8 grams (an 87% yield of nitrated product, assuming all of the solid to be nitroformanilides). 2. The procedure described in Paragraph (1) above is repeated except that the nitric acid/formanilide mole ratio is 1.04/1 and the reaction mixture is poured onto 300 grams of ice. The formanilide used is prepared as described in Step (a). The dried nitration product weighs 48.7 grams (93% yield, assuming all of the product to be nitroformanilides).

1. Hydrolysis

The nitrated product from Step (b)(1) above (45.2 grams), 300 grams of water, and 10 grams of sodium hydroxide are refluxed (100°C.) for 1 hour in a 500-milliliter round-bottomed flask is attached to an 18-inch Vigreux column. The flask is cooled to 25°C., and the solids recovered by filtration. The aqueous solution is extracted with three 250-milliliter portions of ethyl ether. The ether solution is dried over magnesium sulfate and filtered, and the ether removed on a steam cone to provide additional solid material. The solids are combined, air-dried at 3 days, and then vacumm-dried in an oven at 50°C. for 3 hours. The dried solid weighs 37.9 grams (88% nitroaniline yield). Gas chromatographic analysis shows the composition to be 93% p- and 7% o-nitroaniline, thereby establishing a 93/7 percentage ratio of para/ortho isomers of nitroformanilide in the product from Step (b)(1).

c. 2. Methanolysis

The nitrated product from Step (b)(2) above (48.2 grams), 1.5 grams of sodium methoxide, and 250 milliliters of methanol are placed in a 300-milliliter round-bottomed flask, which is then attached to an 18 inch Vigreux column. The contents of the flask are refluxed (60–65°C.) for 1 hour, after which a methanol/methyl formate mixture is taken off gradually over a period of 1 hour. The flask is cooled to 25°C., the mixture filtered, and the remainder of the methanol driven off on a steam cone. The dried yellow solid weighs 43.5 g (96% nitroaniline yield). Gas chromatographic analysis shows the composition to be 88% p- and 7% o-nitroaniline, thereby establishing an 88/7 percentagee ratio of para/ortho isomers of nitroformanilide in the product from Step (b)(2). d. Hydrogenation 1. The hydrolysis product from Step (c)(1) above (18.7 grams), 200 milliliters of methanol, and 2 grams of 5% palladium-on-carbon are heated in a stainless steel shaking autoclave at 100–107°C. under 500 psi hydrogen pressure for 1 hour. The product is cooled to 25°C., discharged, and filtered to remove the palladium catalyst. The filtrate is distilled through an 18-inch Vigreux column to give methanol (b.p. 65°C.), and then under 50 mm. pressure to give 9.2 grams of a solid boiling at 170–180°C. Solid caught in the still head is washed out with methanol, and the methanol removed to recover 2.7 grams. Analysis of the two solids by gas chromatography shows the receiver cut to contain 95.3% p- and 4.6% o-phenylenediamine. The still head portion contains 92% p- and 7% o-phenylenediamine. The diamine yield is 81%.

2. When Step (d)(1) is repeated with the exception that 150 milliliters of water is substituted for the 200 milliliters of methanol, the diamine yield is 78.5%, the para/ortho per cent ratio being 94/6 in the receiver cut and 97/3 in the still head cut.

3. The methanolysis product from Step (c)(2) above is hydrogenated as described in Step (d)(1), using 21.5 grams of the nitroanilines, giving a 75% yield of diamines, the para/ortho percent ratio being 96/4. Hydrogenation of a second 21.5-gram portion of the same methanolysis product using the recycled catalyst gives a 80% yield, the para/ortho per cent ratio being 96/3 (receiver cut) and 91/6 (still head portion).

Combined Steps (c) and (d)

Four steps of nitroformanilide made according to Step (b)(2) above, and consisting of 91% of the para and 9% of the ortho isomer, 50 milliliters of methanol, 0.5 grams of palladium-on-carbon, and 0.25 gram of crushed sodium hydroxide are heated at 100°C. under 500 psi hydrogen for 0.5 hour in a 300 milliliter stainless steel autoclave. During this time the pressure drops 285 psi. The autoclave is cooled to 25°C. and the contents discharged. The solid catalyst is removed by filtration. Gas chromatographic analysis of the filtrate shows in addition to methanol, 52.9% p-phenylenediamine, 8.9% o-phenylenediamine, and 37% N-formyl-p-phenylenediamine.

I claim:

1. A process for preparing p-phenylenediamine comprising
   a. reacting aniline with carbon monoxide at a pressure of at least about 300 atmospheres in the presence of an alkali metal alkoxide.
   b. reacting the resulting formanilide with a nitrating acid; and
   c. converting the nitro group and the N-formyl group of the resulting p-nitroformanilide to amino groups by a catalytic hydrogenation reaction and an hydrolysis, or alcoholysis, reaction.

2. A process of claim 1 wherein the reaction of aniline with carbon monoxide is effected at a temperature in the range of about 100°C. to 300°C., the pressure of the carbon monoxide at least about 500 atmospheres, and said alkali metal alkoxide is a 1 to 4 carbon atom alkyl group alkoxide of a metal selected from the group consisting of sodium, potassium, and lithium.

3. A process of claim 1 wherein formanilide is reacted with a nitrating acid at a temperature below about 5°C.

4. A process of claim 3 wherein said nitrating acid is a mixture of nitric and sulfuric acids.

5. A process of claim 4 wherein the mole ratio of nitric acid to formanilide is about from 1/1 to 1.05/1, and the mole ratio of sulfuric acid to formanilide is about from 3.5/1 to 4.5/1.

6. A process of claim 1 wherein said hydrogenation reaction and said hydrolysis, or alcoholysis, reaction are carried out simultaneously.

7. A process of claim 6 wherein p-nitroformanilide is contacted with hydrogen, a hydrogenation catalyst, a base, and water or an alcohol at a hydrogen pressure of at least about 100 psi and a temperature in the range of about from 50°C. to 150°C.

8. A process for preparing a p-phenylenediamine comprising contacting p-nitroformanilide with hydrogen, a hydrogenation catalyst, a base, and water or an alcohol at a hydrogen pressure of at least about 100 psi and a temperature in the range of about from 50°C. to 150°C.

9. A process of claim 8 wherein said p-nitroformanilide is contacted with hydrogen, a hydrogenation catalyst, and water, and said base is an alkali metal hydroxide.

10. A process of claim 8 wherein said p-nitroformanilide is contacted with hydrogen, a hydrogenation catalyst, and an alcohol, and said base is an alkali metal alkoxide.

* * * * *